United States Patent [19]
Walker

[11] Patent Number: 5,950,349
[45] Date of Patent: Sep. 14, 1999

[54] SAFETY FISHING LINE RELEASE

[76] Inventor: Jack A. Walker, N38 W27273 Parkside Rd., Pewaukee, Wis. 53072

[21] Appl. No.: 09/034,094

[22] Filed: Mar. 3, 1998

Related U.S. Application Data

[62] Division of application No. 08/788,690, Jan. 24, 1997, Pat. No. 5,784,826.

[51] Int. Cl.$^6$ ..................................................... A01K 91/03
[52] U.S. Cl. ......................................... 43/43.12; 43/44.95
[58] Field of Search ..................................... 43/17.2, 43.1, 43/43.12, 44.95, 44.92, 44.87, 44.88, 27.4

[56] References Cited

U.S. PATENT DOCUMENTS

| | | | |
|---|---|---|---|
| 3,500,575 | 3/1970 | Klemkowski | 43/43.11 |
| 4,698,933 | 10/1987 | Shaw | 43/43.12 |
| 4,825,583 | 5/1989 | Kammeraad | 43/43.12 |
| 5,163,246 | 11/1992 | Shaw | 43/43.12 |

*Primary Examiner*—Jack W. Lavinder
*Attorney, Agent, or Firm*—Donald J. Ersler

[57] ABSTRACT

A safety fishing line release includes a first arm, a second arm, a spring, a first frictional pad, a second frictional pad, and a peg. The first arm has a tab opening at a first end which is sized to loosely receive a tab disposed at a first end of the second arm. The second arm has a pad opening at a second offset which is sized to facilitate insertion of the second end of the first arm therethrough. The first and second frictional pads are fastened to the second ends of the first and second arms, respectively. A peg extends outward perpendicularly from the second frictional pad. A peg opening is formed in the first frictional pad and second end of the first arm. A spring is inserted between the first and second arms, the spring forces the first frictional pad against the second frictional pad such that a fishing line maybe fictionally retained between the first and second frictional pads. A typical fishing line release may be also improved by adding a peg to eliminate the possibility of detachment from a fishing line. The safety fishing line release may be further improved by using the peg as a pivot to retain a pulley. A second safety feature utilizes a first and second prong to retain the fishing line instead of the peg or in combination with thereof. The safety fishing line release may be further improved by adding a force adjustment device. A second preferred embodiment of the safety fishing line release utilizes a force adjustment device and a simpler design.

13 Claims, 4 Drawing Sheets

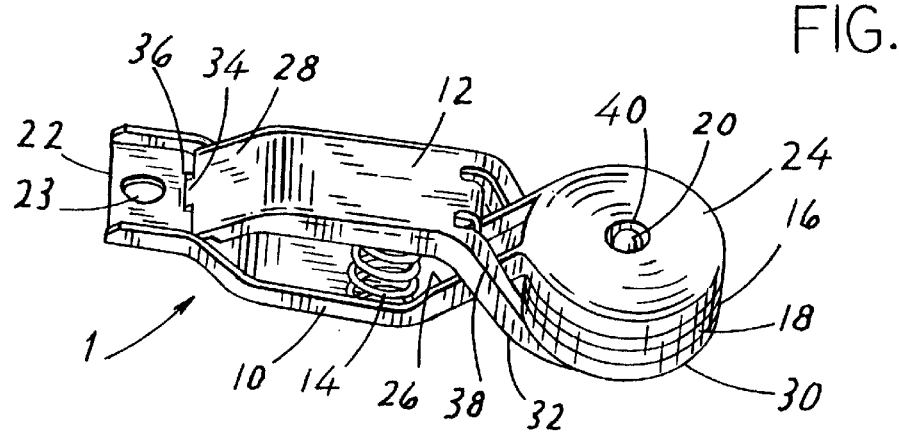
FIG. 1
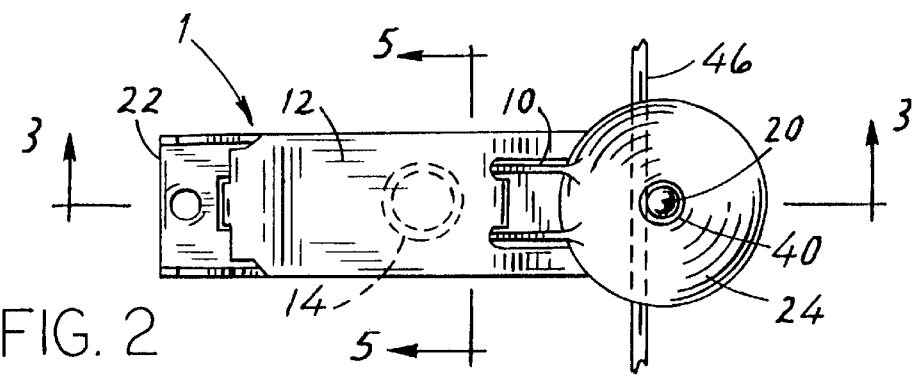
FIG. 2
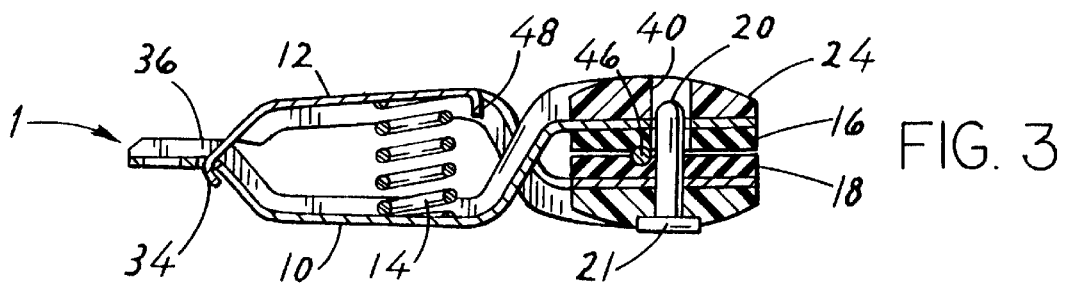
FIG. 3
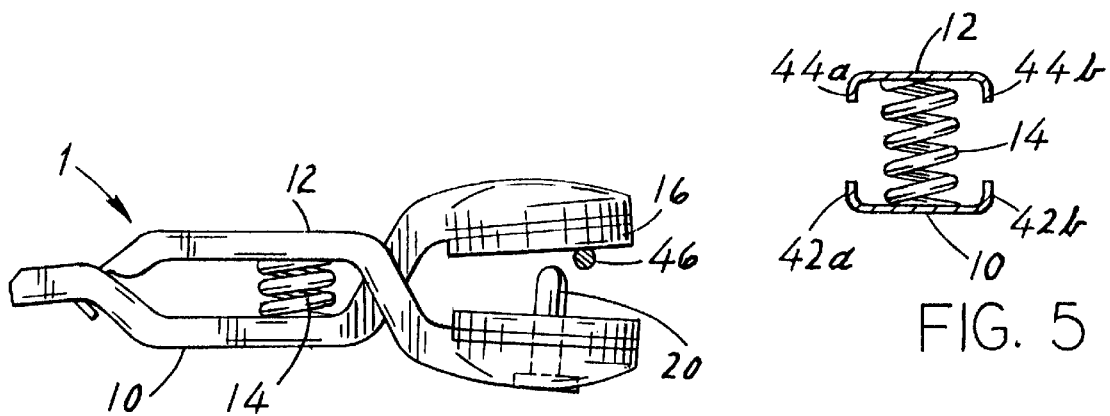
FIG. 4
FIG. 5

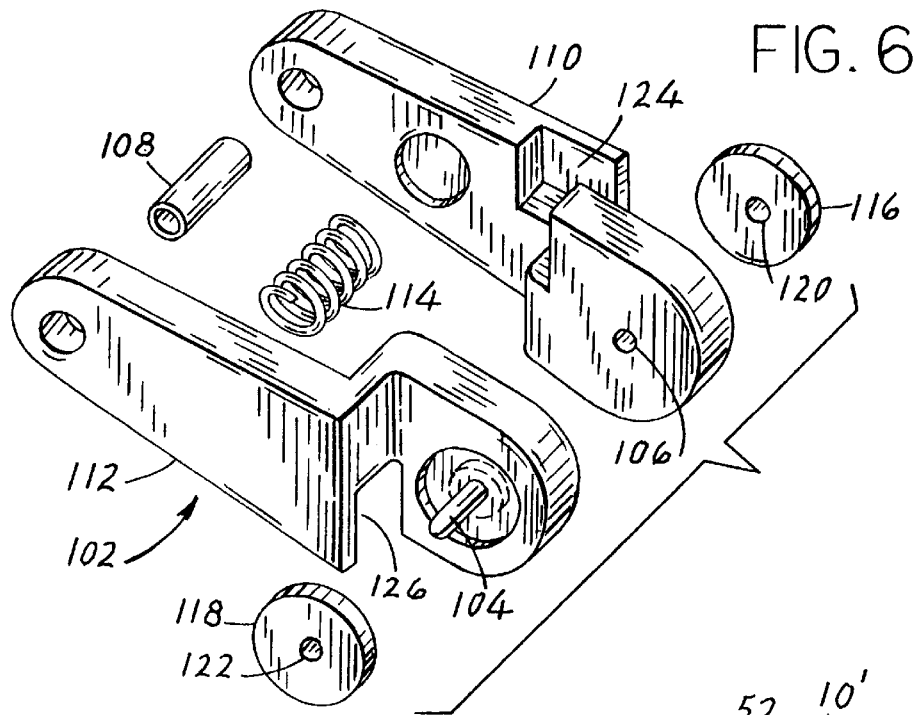
FIG. 6
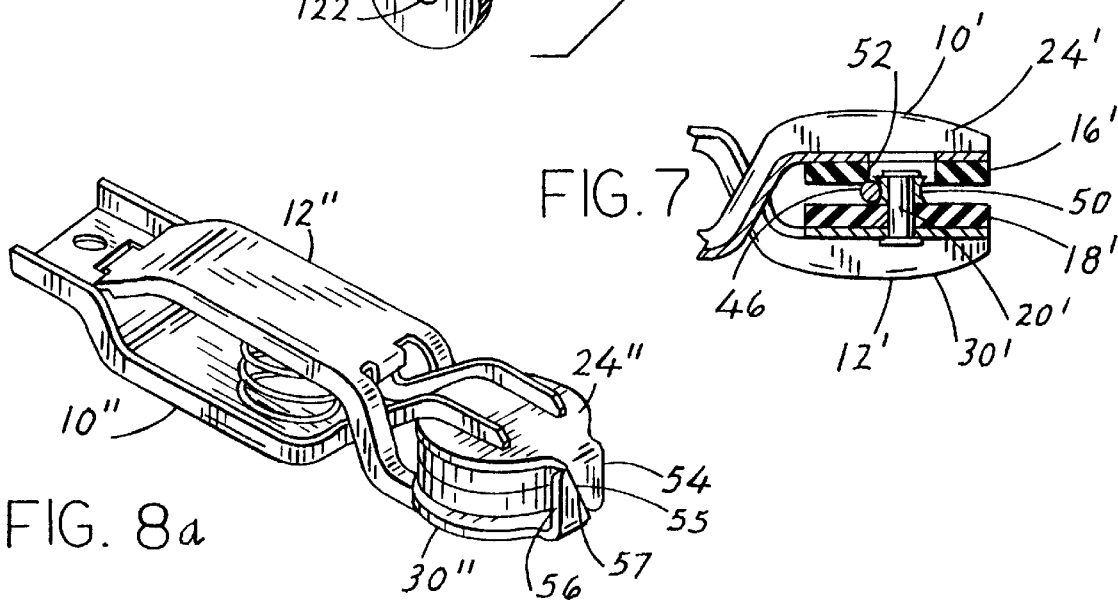
FIG. 7
FIG. 8a
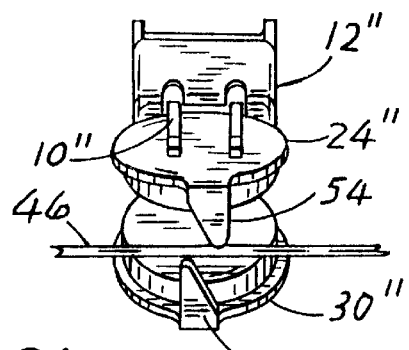
FIG. 8b

SAFETY FISHING LINE RELEASE

CROSS-REFERENCES TO RELATED APPLICATIONS

This is a divisional application, Ser. No. 08/788,690 filed on Jan. 24, 1997, now U.S. Pat. No. 5,784,826.

BACKGROUND OF THE INVENTION

1. Field of the Invention

The present invention relates generally to a fishing line release and more specifically to a safety fishing line release which positively retains a fishing line if the frictional contact between the frictional pads and the fishing line is broken.

2. Discussion of the Prior Art

A fishing line release allows a lure to be fished at a predetermined depth by allowing a weight to be added to the system. The fishing line release is clipped to the fishing line at a predetermined length from the lure. A weight is attached to the fishing line release, which causes the lure on the line to seek a predetermined depth.

A fishing line release also is utilized with side trolling boards. The side trolling board allows at least one fishing line to be fished a predetermined distance from a trolling boat. The side trolling board tracks and pulls parallel to the side of the boat at the predetermined distance. The side trolling board includes a fishing line release. The fishing line release is clipped to the fishing line to position the side trolling board at a predetermined distance from the side of the boat, and a lure is positioned a predetermined distance from the side trolling board. The fishing line release is also used with outriggers and downriggers.

Most fishing line releases have a pair of spring loaded pincers which retain the fishing line by friction between two parallel pads. There are several patented designs of fishing line releases which utilize parallel pads to retain the fishing line, these include Pat. Nos. 4,68,933, 4,825,585, and 5,163,246. The drawback to these designs is that the fishing line will often slip out of the parallel pads while fishing. This will result in the loss of the fishing line release and weight. The fishing line release will also be lost when the lure is struck by a fish. If a side trolling board, outrigger, or downrigger are used, the loss will be the fishing line release and a piece of expensive equipment that the fishing line release is attached to. The probability of loss has become especially acute with the advent of super-thin lines such as kelvar which are especially slippery and more difficult to retain by the parallel pads of a fishing line release.

To overcome the problems associated with the detachment of a fishing line from a fishing line release, many manufacturers have resorted to using heavy spring force to keep the fishing line release clipped to the fishing line. The drawback to this strategy is that the fishing line release will damage the fishing line. The fishing line release with heavy spring force will also require another tool just to open thereof.

Another drawback to the prior art fishing line releases is a lack of spring adjustment. It is sometimes necessary to adjust the amount of force applied to the fishing line through the parallel pads. This is especially critical when the fishing line release is used with a trolling board, downrigger, or outrigger.

Accordingly, there is a clearly felt need in the art for a safety fishing line release which allows adjustment of the force applied by the parallel pads, has a safety feature that positively retains a fishing line between parallel pads, will not damage fishing lines, allows the use of heavier lures, and does not allow the loss of valuable equipment, unlike the prior art fishing line releases.

SUMMARY OF THE INVENTION

The primary objective of the present invention is to provide a safety fishing line release which allows adjustment of the force applied by the parallel pads, has a safety feature that positively retains a fishing line between parallel pads, will not damage fishing lines, allows the use of heavier lures, and does not allow the loss of valuable equipment, unlike the prior art fishing line releases.

According to the present invention, a safety fishing line release includes a first arm, a second arm, a spring, a first frictional pad, a second frictional pad, and a peg. The first arm of the safety fishing line release has a first end, a second end, and a first offset at substantially the second end thereof. The second arm of the safety fishing line release has a first end, a second end, and a second offset at substantially the second end thereof.

The first arm has a tab opening at the first end which is sized to loosely receive a tab which is disposed at the first end of the second arm. The second arm has a pad opening disposed in the second offset which is sized to facilitate insertion of the second end of the first arm through the pad opening of the second arm. The first frictional pad is fastened to the second end of the first arm. The second frictional pad is fastened to the second end of the second arm. A peg extends outwardly from the second frictional pad. A peg opening is formed in the first frictional pad and second end of the first arm to provide clearance for the peg.

A spring is inserted between the first arm and the second arm, the spring forces the first frictional pad against the second frictional pad such that a fishing line may be fictionally retained between the first and second frictional pads. At assembly, the second end of the first arm is inserted through the pad opening in the second arm. The tab of the second arm is inserted into the tab opening in the first arm and bent over between 15 and 45 degrees to retain the first arm in pivotal relation with the second arm.

In a second preferred embodiment, a safety fishing line release includes a first arm, a second arm, a first frictional pad, a second frictional pad, a peg, and a cam force adjustment assembly. The second arm is fastened to the first arm at substantially the middle of the first arm such that the second arm does not rotate in relation to the first arm. The first frictional pad is fastened to a second end of the first arm. The second frictional pad is fastened to a second end of the second arm. A peg extends outwardly from the second frictional pad. A peg opening is formed in the first frictional pad and second end of the first arm to provide clearance for the peg.

A cam force adjustment assembly includes a cam lever, a spring, and a threaded rod. A bore is formed in the first and second arms at substantially the second end thereof. The threaded rod is inserted through the spring, and a bore in the first and second arms. A nut is fastened to a threaded end of the threaded rod and a pin hole is formed perpendicular to the axis of the thread rod at the other end. The cam lever includes dual cam surfaces, and a lift lever. A bore is formed through the dual cam surfaces. A pin is inserted through the dual cam surfaces and the pin hole. The pin in peened over to retain the cam lever in rotable relationship with the threaded rod. Rotation of the cam lever forces the first and second frictional pads against an inserted fishing line.

The safety fishing line release or a typical fishing line release may be further improved by using the peg to retain a pulley. If the fishing line has axial movement in relation to the peg, the fishing line will cause the pulley to rotate, thus preventing the fishing line from being subjected to wear from a stationery peg.

A second safety feature utilizes a first prong mounted to the first end and a second prong mounted to the second end to prevent detachment of the fishing line from the fishing line release. The first and second prong may be substituted for the peg, or to complement the operation of the peg.

A typical fishing line release such as those previously mentioned, may be improved by adding a peg to eliminate being detached from a fishing line. A typical fishing line release may also be improved by adding a pulley or by substituting the second preferred embodiment of the safety feature for the peg or to complement the operation of the peg.

The force applied by the first and second frictional pads of the first preferred embodiment of the safety fishing line release can be adjusted by several force adjustment devices. The cam force adjustment assembly used in the second preferred embodiment of the safety fishing line release can be used with the first preferred embodiment of the safety fishing line release to adjust the force exerted by the first and second frictional pads.

A force adjustment assembly includes a wing nut, an adjustment bolt, and a compression spring. A bore is formed through the first arm, second arm, first frictional pad, and second frictional pad. The adjustment bolt is inserted through the bores in the first arm, the second arm, the first frictional pad, and the second frictional pad. The compression spring is placed over the adjustment bolt, and a wing nut is threaded onto a threaded end of the adjustment bolt. The force between the first and second frictional pads is increased by rotating the wing nut.

A force compression assembly is substituted for the spring in the first preferred embodiment of the safety fishing line release to allow the force exerted by the first and second frictional pads to be adjusted. The force compression assembly includes a knurled bolt, a nut, and a compression spring. A coined plug is formed in the first arm at substantially the middle thereof. The compression spring is placed over the coined plug and retained thereby. A nut is fastened to the second arm at substantially the middle thereof. The knurled bolt has a knurled knob at one end and a reduced diameter on the other end which is sized to be inserted into the compression spring. To increase the force exerted by the first and second frictional pads, the knurled knob is rotated until the desired force is achieved.

Accordingly, it is an object of the present invention to provide a safety fishing line release which positively retains a fishing line.

It is a further object of the present invention to provide a safety fishing line release which eliminates the possibility of detachment from a fishing line, yet allows the fishing line to be quickly and easily inserted and removed from the safety fishing line release.

It is yet a further object of the present invention to provide a safety fishing line release which allows the use of heavier weights and lures then that of the prior art.

It is yet a further object of the present invention to provide a safety fishing line release which will retain fishing lines securely while not damaging thereof.

It is yet a further object of the present invention to provide a safety fishing line release which has a provision for providing adjustable force to retain the fishing line.

Finally, it is another object of the present invention to provide a safety fishing line release which eliminates the need for replacing equipment which is lost when a fishing lure is struck by a fish.

These and additional objects, advantages, features and benefits of the present invention will become apparent from the following specification.

BRIEF DESCRIPTION OF THE DRAWINGS

FIG. 1 is a perspective detail view of a safety fishing line release in accordance with the present invention;

FIG. 2 is a top view of a safety fishing line release in accordance with the present invention;

FIG. 3 is a cross sectional detail view of a safety fishing line release in accordance with the present invention;

FIG. 4 is a side view of a safety fishing line release which is fully compressed to allow insertion of a fishing line in accordance with the present invention;

FIG. 5 is a cross sectional detail view of a spring being retained between a first and second arm in accordance with the present invention;

FIG. 6 is an exploded perspective detail view of a modified fishing line release which has been modified with a safety peg to prevent loss of a fishing line;

FIG. 7 is a cross sectional detail view of the second ends of the first and second arm with the addition of a pulley pivotally constrained by a peg in accordance with the present invention;

FIG. 8a is a perspective view of a second safety feature in a closed position which prevents a fishing line from being detached from a fishing line release in accordance with the present invention;

FIG. 8b is a perspective view of a second safety feature in a open position which prevents a fishing line from being detached from a fishing line release in accordance with the present invention;

DETAILED DESCRIPTION OF THE PREFERRED EMBODIMENTS

Figure 9:
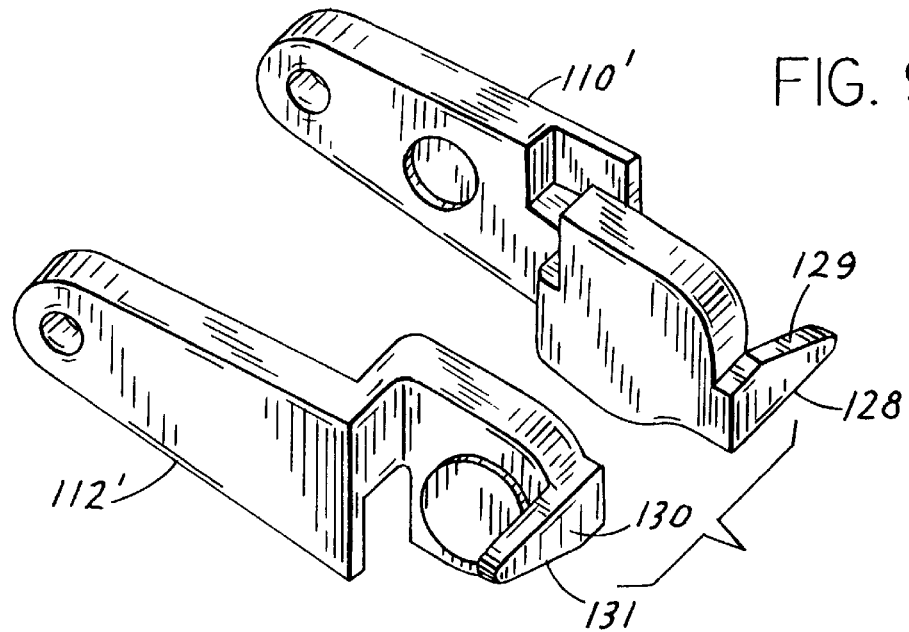
FIG. 9 is an exploded perspective view of a modified fishing line release which has been modified with the second safety feature.

With reference now to the drawings, and particularly to FIG. 1, there is shown a perspective detail view of a safety fishing line release 1. With reference to FIG. 3 which is cut from a cross section of FIG. 2, the safety fishing line release 1 comprises a first arm 10, a second arm 12, a spring 14, a first frictional pad 16, a second frictional pad 18, and a peg 20. The first arm 10 of the safety fishing line release 1 has a first end 22, a second end 24, and a first offset 26 at substantially the second end 24 thereof. The second arm 12 of the safety fishing line release 1 has a first end 28, a second end 30, and a second offset 32 at substantially the second end 30 thereof.

The first arm 10 has a tab opening 36 disposed at the first end 22 which is sized to loosely receive a tab 34 which is disposed at the first end 28 of the second arm 12. A swivel hole 23 is formed in the first end 22 of the first arm 10 to allow attachment of a swivel line or other pivot retention device. The second arm 12 has a pad opening 38 disposed at the second offset 32 which is sized to facilitate insertion of the second end 24 of the first arm 10 through the pad opening 38 of the second arm 12. The first frictional pad 16 is fastened to the second end 24 of the first arm 10. The second frictional pad 18 is fastened to the second end 30 of the second arm 12. A peg 20 extends outwardly from the second frictional pad 18. A peg opening 40 is formed in the first frictional pad 16 and the second end 24 of the first arm 10 to provide clearance for the peg 20. The peg 20 may have a head 21 to facilitate simple attachment to the second arm 12. The cross section of the peg 20 may be any shape, but is preferably round or elliptical to prevent wear to a fishing line.

FIG. 4 shows the insertion of a fishing line 46 between the peg 20 and the first friction pad 16 of the safety fishing line release 1. A thumb and forefinger are used to compress the first arm 10 and the second arm 12 together, such that a sufficient distance is created for slipping the fishing line 46 past the peg 20. After the fishing line 46 has been slipped past the peg 20, the first arm 10 and the second arm 12 are released. The fishing line 46 will be retained by the frictional force exerted by the first frictional pad 16, and the second frictional pad 18. If the frictional force is insufficient to retain the fishing line 46, then the peg 20 will positively prevent the release of the fishing line 46 from the safety fishing line release 1. In actual use, when a lure on the fishing line is struck by a fish, the safety fishing line release will slide down the line toward the lure, but will not detach from the fishing line.

FIG. 5 shows a cross section of the spring 14 which is cut from a top view of the safety fishing line release 1 in FIG. 2. The spring 14 is inserted between the first arm 10 and the second arm 12. First retaining lips 42a and 42b extend perpendicularly from the edges of first arm 10, and second retaining lips 44a and 44b extend perpendicularly from the edges of second arm 12. The first retaining lips 42a & 42b, and the second retaining lips 44a & 44b prevent lateral movement of the spring 14. With reference to FIG. 3, a retaining tab 48 is disposed at substantially said second end 30 of said second arm 12 and prevents the spring 14 from moving toward the second end 24 of the first arm 10.

At assembly, the second end 26 of the first arm 10 is inserted through the pad opening 38 in the second arm 12. The tab 34 of the second arm 12 is inserted into the tab opening 36 in the first arm 10 and bent over between 15 and 45 degrees to retain the first arm 10 in pivotal relation with the second arm 12.

FIG. 6 shows an exploded perspective detail view of a modified fishing line release 102 which has been modified with a safety peg 104 to prevent detachment from a fishing line. The modified fishing line release 102 includes a first arm 110, a second arm 112, a spring 114, a fastening pin 108, a first frictional pad 116, and a second frictional pad 118. A peg clearance opening 106 is formed in the first arm 110 to loosely receive the peg 104. A first peg opening 120 is formed in the first frictional pad 116 and a second peg opening 122 is formed in the second frictional pad 118.

At assembly, the second arm 112 fits inside a first notch 124 of the first arm 110 and the first arm 110 fits inside a second notch 126 of the second arm 112. The second frictional pad 118 is fastened to the second arm 112 and the first frictional pad 116 is fastened to the first arm 110. The spring 114 fits between the first arm 110 and the second arm 112. The fastening pin 108 is penned over on each end to fasten the ends of the first arm 110 and the second arm 112 together. The modified fishing line release 102 works similar to the safety fishing release 1, the first arm 110 and the second arm 112 are forced together with a thumb and forefinger to allow insertion of a fishing line.

FIG. 7 shows a cross sectional detail view of the second end 24' of the first arm 10' and the second end 30' of the second arm 12' with the addition of a pulley 50. The pulley 50 is also pivotally constrained by a peg 40'. The pulley 50 pivots in relation to the peg 40' and is peened over on each end to retain thereof. A pulley opening 52 is created in the first frictional pad 16 and the second end 24' of the first arm 10 to allow clearance for the pulley 50. If fishing line 46 has an axial movement relative to the peg 20', the fishing line 46 will cause the pulley 50 to rotate, thus preventing the fishing line 46 from being subjected to wear from a stationery peg. Both the safety fishing line release 1 and the modified fishing line release 102 may be further improved by the inclusion of the pulley 50.

FIG. 8a shows a perspective view of a second safety feature in a closed position. A first prong 54 is formed on the second end 24" of the first arm 10" and a second prong 56 is formed on the second end 30" of the second arm 12". The first prong 54 has a first tapered edge 55 and the second prong 56 has a second tapered edge 57. The first tapered edge 55 and second tapered edge 57 are structured to make smooth contact with each. With reference to FIG. 8b, a fishing line 46 may be inserted between the first prong 54 and the second prong 56 when a thumb and forefinger are used to compress the first arm 10" and the second arm 12" together. The second safety feature can be used to replace the peg 20 or to complement the operation of the peg 20. The peg 20 can be used to retain a fishing line between the first frictional pad 16 and the second frictional pad 18, while a second line may be slidably retained by the first prong 54 and the second prong 56.

FIG. 9 shows an exploded perspective view of a modified fishing line release which has been modified with the second safety feature. A first prong 128 is formed on the first arm 110' and a second prong 130 is formed on the second arm 112'. The first prong 128 has a first tapered edge 129 and the second prong 130 has a second tapered edge 131. The first tapered edge 129 and second tapered edge 131 are structured to make smooth contact with each. The operation of the second safety feature is the same as that in FIGS. 8a & 8b. The second safety feature can be used to replace the peg 104 or to complement the operation of the peg 104. The peg 104 can be used to retain a fishing line between the first frictional pad 116 and the second frictional pad 118, while a second line may be slidably retained by the first prong 128 and the second prong 130.

Figure 10:
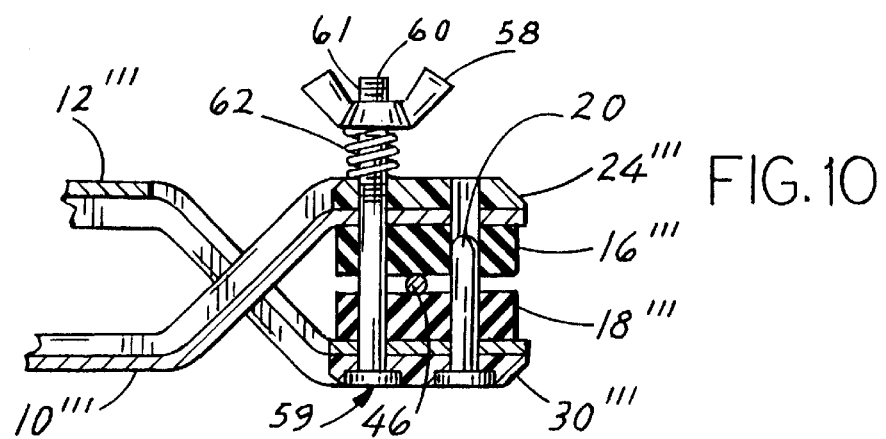
FIG. 10 is a cross sectional detail view of a force adjustment assembly which controls the force exerted by the first and second frictional pads in accordance with the present invention.

FIG. 10 shows a cross sectional detail view of a force adjustment assembly 59 mounted in the second end of a safety fishing line release. The force adjustment assembly 59 can be used to vary the force exerted by the first frictional pad 16''' and second frictional pad 18''' on the fishing line 46. The force adjustment assembly 59 includes a wing nut 58, an adjustment bolt 60, and a compression spring 62. A bore is formed through the second end 24''' of the first arm 10''', the second end 30''' of the second arm 12''', the first frictional pad 16''', and the second frictional pad 18'''. The adjustment bolt 60 is inserted through the bores in the second end 24''' of the first arm 10''', the second end 30''' of the second arm 12''', the first frictional pad 16''', and the second frictional pad 18'''. The compression spring 62 is placed over the adjustment bolt 60, and a wing nut 58 is threaded onto a threaded end 61 of the adjustment bolt 60. The force between the first frictional pad 16''' and the second frictional pad 18''' is increased by rotating the wing nut 58.

Figure 11A:
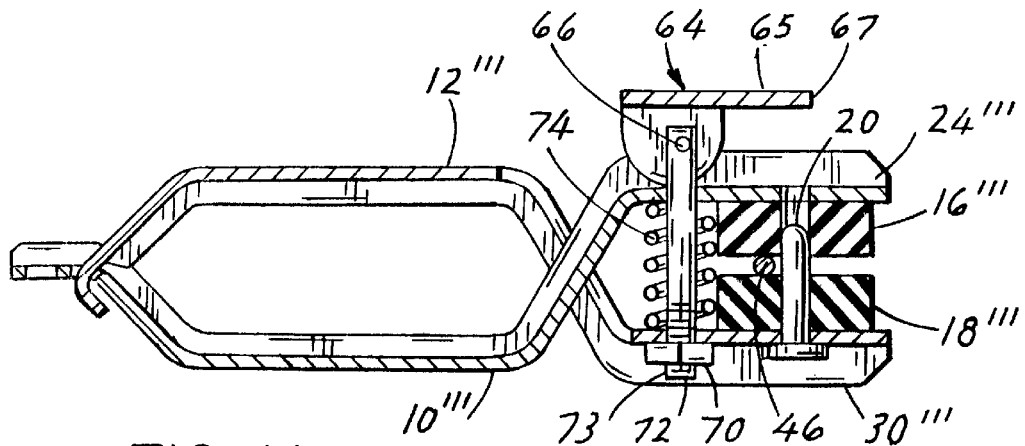
FIG. 11a is a cross sectional detail view of a cam force adjustment assembly which controls the force exerted by the first and second frictional pads in accordance with the present invention.

FIG. 11a shows a cross sectional detail view of a cam force adjustment assembly 64 which replaces the spring 14 in the safety fishing line release 1. The cam force adjustment assembly 64 is more flexible than the spring 14, because the force exerted by the first frictional pad 16''' and the second frictional pad 18''' can be adjusted.

Figure 11B:
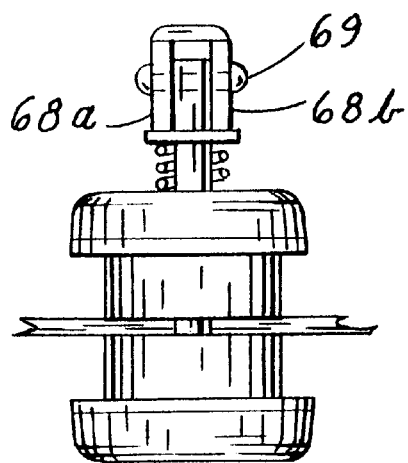
FIG. 11b is a front view of a cam force adjustment assembly attached to a safety fishing line release in accordance with the present invention.

The cam force adjustment assembly 64 includes a cam lever 65, a spring 74, and a threaded rod 72. A bore is formed in the second end 24''' of the first arm 10''', and the second end 30''' of the second arm 12'''. The threaded rod 72 is inserted through the bore in the first arm 10''', the spring 74, and the second arm 12'''. A nut is threaded onto a threaded end 73 of the threaded rod 72 and a pin hole 66 is formed perpendicular to the axis of the thread rod 72 at the other end. With reference to FIG. 11b, the cam lever 65 includes a first cam surface 68a, a second cam surface 68b, and a lift lever 67. A concentric bore is formed through the first cam surface 68a and second cam surface 68b. A pin 69 is inserted through the first cam surface 68a, second cam surface 68b, and the pin hole 66. The pin 69 is peened over on each end to retain the cam lever 65 in rotable relationship with the threaded rod 72. Rotation of the cam lever 65 to the maximum position forces the first frictional pad 16''' and the second frictional pad 18''' against fishing line 46. Rotation of the cam lever 65 in the opposite direction will allow insertion of the fishing line 46.

Figure 12:
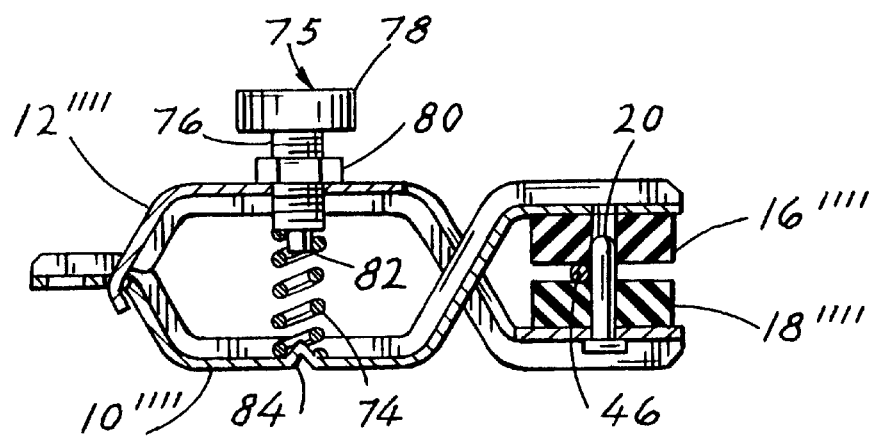
FIG. 12 is a cross sectional detail view of a force compression assembly which replaces the spring of a safety fishing line release in accordance with the present invention.

FIG. 12 shows a cross sectional detail view of a force compression assembly 75 which replaces the spring 14 of the safety fishing line release 1. The force compression assembly 75 is more flexible than the spring 14, because the force exerted by the first frictional pad 16'''' and the second frictional pad 18'''' can be adjusted. The force compression assembly 75 includes a knurled bolt 76, a nut 80, and a compression spring 74. A coined plug 84 is formed in the first arm 10'''' at substantially the middle thereof. The compression spring 74 is placed over the coined plug 84 and retained thereby. The nut 80 is fastened to the second arm 12'''' at substantially the middle thereof. The knurled bolt 76 has a knurled knob 78 at one end and a reduced diameter 82 on the other end. The reduced diameter 82 is sized to be inserted into the compression spring 74. To increase the force exerted by the first frictional pad 16'''' and the second frictional pad 18'''', the knurled knob 78 is rotated until the desired force is exerted on the fishing line 46.

Figure 13:
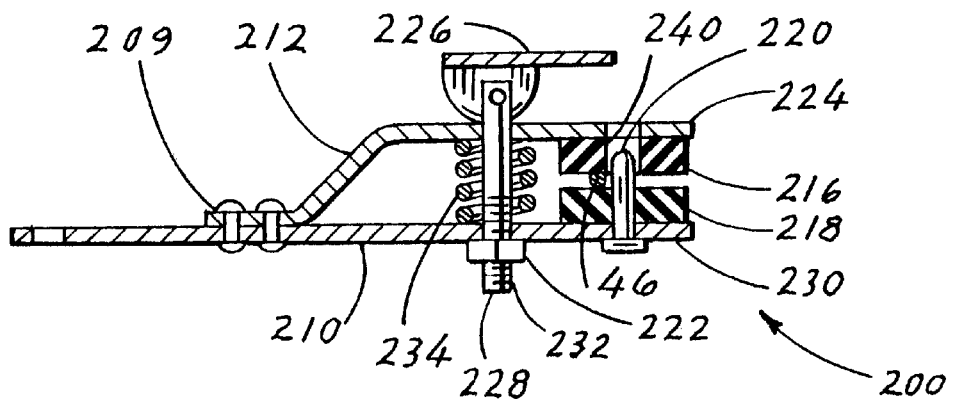
FIG. 13 is a cross sectional detail view of a second preferred embodiment of a safety fishing line release in accordance with the present invention.

FIG. 13 shows a cross sectional detail view of a second preferred embodiment of a safety fishing line release 200. The safety fishing line release 200 includes a first arm 210, a second arm 212, a first frictional pad 216, a second frictional pad 218, a peg 220, and a cam force adjustment assembly 226. A first end 209 of the second arm 212 is fastened to the first arm 210 at substantially the middle thereof, such that the second arm 212 does not rotate in relation to the first arm 210. The first frictional pad 216 is fastened to a second end 224 of the first arm 210. The second frictional pad 218 is fastened to a second end 230 of the second arm 212. A peg 220 extends outwardly from the second frictional pad 218. A peg opening 240 is formed in the first frictional pad 216 and the second end 224 of the first arm 210 to provide clearance for the peg 220.

A cam force adjustment assembly 226 includes a cam lever 226, a compression spring 234, and a threaded rod 228. A bore is formed through the first arm 210 at substantially the second end 224 thereof, and the second arm 212 at substantially the second end 230 thereof. The threaded rod 228 is inserted through the bore in the first arm 210, the compression spring 234, and the second arm 212. A nut 222 is fastened, to a threaded end 232 of the threaded rod 228. Rotation of the cam lever 226 forces the first frictional pad 216 and the second frictional pad 218 against the fishing line 46. Rotation of the cam lever 226 in the opposite direction will allow insertion of the fishing line 46.

The force adjustment assembly 59 of FIG. 10 may be substituted for the cam force adjustment assembly 226. The spring 234 is included with the force adjustment assembly 59 to bias the second arm 212 away from the first arm 210. The wing nut 58 is rotated to force the first frictional pad 216 against the second friction pad 218 to retain a fish line 46.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A safety fishing line release for positively retaining a fishing line comprising:

a first arm;

a second arm being engaged with said first arm at a first end thereof;

a first frictional pad which is fastened to said first arm at a second end;

a second frictional pad which is fastened to said second arm at a second end, said frictional pads being fabricated from a different material than said arms;

a first prong being formed on said second end of said first arm; and a second prong being formed on said second end of said second arm, said first and second prongs being adjacent said frictional pads, wherein said first prong mating with said second prong such that the fishing line cannot be detached from said safety fishing line release.

2. The safety fishing line release for positively retaining the fishing line of claim 1, wherein:

said first prong having a first tapered edge; and said second prong having a second tapered edge, wherein said first prong mating with said second prong.

3. The safety fishing line release for positively retaining the fishing line of claim 1, further comprising:

a spring which is disposed between said first arm and said second arm.

4. The safety fishing line release for positively retaining the fishing line of claim 3, further comprising:

said first arm having a first end, and a first notch being formed at said second end of said first arm;

said second arm having a first end, and a second notch being formed at said second end of said second arm, wherein said first arm being inserted into said second notch and said second arm being inserted into said first notch; and said first end of said first arm being fastened to said first end of said second arm.

5. The safety fishing line release for positively retaining the fishing line of claim 3, further comprising:

a pair of first retaining lips being disposed at edges of said first arm;

a pair of second retaining lips being disposed at edges of said second arm; and a retaining tab being disposed at substantially said second end of said second arm, wherein said pair of first retaining lips, said pair of second retaining lips, and said retaining tab preventing said spring from making lateral movement.

6. The safety fishing line release for positively retaining the fishing line of claim 1, further comprising:

a tab being disposed at a first end of said second arm;

said first arm having a swivel hole at a first end;

said first arm having a tab opening at said first end which sized to slidably receive said tab of said second arm, wherein said tab being inserted into said tab opening, said tab being bent to retain said second arm in pivotal relationship with said first arm.

7. The safety fishing line release for positively retaining the fishing line of claim 6, further comprising:

a pad opening being disposed at a second offset of said second arm, said second end of said first arm being inserted through said pad opening of said second arm.

8. A safety fishing line release for positively retaining a fishing line comprising:

a first arm;

a second arm being engaged with said first arm at a first end thereof;

a first frictional pad which is fastened to said first arm at a second end;

a second frictional pad which is fastened to said second arm at a second end, said frictional pads being fabricated from a different material than said arms;

a spring which is disposed between said first arm and said second;

a first prong being formed on said second end of said first arm; and a second prong being formed on said second end of said second arm, said first and second prongs being adjacent said frictional pads, wherein said first prong mating with said second prong such that the fishing line cannot be detached from said safety fishing line release.

9. The safety fishing line release for positively retaining the fishing line of claim 8, wherein:

said first prong having a first tapered edge; and said second prong having a second tapered edge, wherein said first prong mating with said second prong.

10. The safety fishing line release for positively retaining the fishing line of claim 8, further comprising:

said first arm having a first end, and a first notch being formed at said second end of said first arm;

said second arm having a first end, and a second notch being formed at said second end of said second arm, wherein said first arm being inserted into said second notch and said second arm being inserted into said first notch; and said first end of said first arm being fastened to said first end of said second arm.

11. The safety fishing line release for positively retaining the fishing line of claim 8, further comprising:

a tab being disposed at a first end of said second arm;

said first arm having a swivel hole at a first end;

said first arm having a tab opening at said first end which sized to slidably receive said tab of said second arm, wherein said tab being inserted into said tab opening, said tab being bent to retain said second arm in pivotal relationship with said first arm.

12. The safety fishing line release for positively retaining the fishing line of claim 11, further comprising:

a pad opening being disposed at a second offset of said second arm, said second end of said first arm being inserted through said pad opening of said second arm.

13. The safety fishing line release for positively retaining the fishing line of claim 8, further comprising:

a pair of first retaining lips being disposed at edges of said first arm;

a pair of second retaining lips being disposed at edges of said second arm; and a retaining tab being disposed at substantially said second end of said second arm, wherein said pair of first retaining lips, said pair of second retaining lips, and said retaining tab preventing said spring from making lateral movement.

* * * * *